(12) United States Patent
McNeil et al.

(10) Patent No.: US 7,203,805 B2
(45) Date of Patent: *Apr. 10, 2007

(54) METHOD AND SYSTEM FOR PROVIDING AN INTERLEAVED BACKUP

(75) Inventors: Daniel D. McNeil, Tigard, OR (US); Joseph L. DiMartino, Beaverton, OR (US); Jaspal Kohli, Sunnyvale, CA (US)

(73) Assignee: Mirapoint, Inc., Sunnyvale, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 10/678,455

(22) Filed: Oct. 3, 2003

(65) Prior Publication Data
US 2004/0068630 A1 Apr. 8, 2004

Related U.S. Application Data

(63) Continuation of application No. 09/697,893, filed on Oct. 26, 2000, now Pat. No. 6,691,212.

(51) Int. Cl.
*G06F 11/14* (2006.01)

(52) U.S. Cl. .................. 711/162; 711/112; 711/157

(58) Field of Classification Search ................ 711/162, 711/161, 165, 170–173, 154, 100, 111, 114, 711/157; 714/6, 15, 20; 707/202, 204
See application file for complete search history.

(56) References Cited

U.S. PATENT DOCUMENTS

| | | | |
|---|---|---|---|
| 5,177,744 A | * | 1/1993 | Cesare et al. .................. 714/6 |
| 5,212,772 A | | 5/1993 | Masters |
| 5,522,037 A | | 5/1996 | Kitagawa et al. |
| 5,642,496 A | | 6/1997 | Kanfi |
| 5,758,359 A | | 5/1998 | Saxon |
| 5,778,395 A | | 7/1998 | Whiting et al. |
| 5,950,218 A | | 9/1999 | Howard |
| 6,115,781 A | | 9/2000 | Howard |
| 6,487,644 B1 | | 11/2002 | Huebsch et al. |

FOREIGN PATENT DOCUMENTS

| | | |
|---|---|---|
| EP | 0 259 912 A1 | 3/1988 |
| WO | WO 02/35352 A2 | 5/2002 |

OTHER PUBLICATIONS

"Organization And Analysis Of A Gracefully-Degrading Interleaved Memory System", Cheung et al., International Conference on Computer Architecture, 1987 pp. 224-231.*

* cited by examiner

*Primary Examiner*—Pierre-Michel Bataille
(74) *Attorney, Agent, or Firm*—Bever, Hoffman & Harms, LLP; Jeanette S. Harms

(57) ABSTRACT

The data from a plurality of primary data sources, such as disk drives or disk arrays, are interleaved and captured in a secondary data source, such as a tape drive, during a backup operation. The interleaving of data allows the overlap of read/write operations performed by the plurality of primary data sources, thereby optimizing the performance of the backup as well as the restore.

4 Claims, 5 Drawing Sheets

METHOD AND SYSTEM FOR PROVIDING AN INTERLEAVED BACKUP

RELATED APPLICATIONS

This application is a continuation of U.S. patent application Ser. No. 09/697,893, entitled "Method And System For Providing An Interleaved Backup" filed Oct. 26, 2000 now U.S. Pat. No. 6,691,212.

BACKGROUND OF THE INVENTION

1. Field of the Invention

The present invention relates to a method and system for backing up data from a plurality of disks, and particularly to interleaving the data from the disks during backup, thereby decreasing the time to perform a backup as well as a restore.

2. Related Art

Backing up data from one or more computer disks is typically performed to recover from inadvertent user deletions/overwrites or from disk hardware failure. In the case of inadvertent user deletions/overwrites, only the data corresponding to the destroyed data is copied to the original disk from the backup. In the case of disk hardware failure, the user can restore all files to the original disk from the most recent backup.

In most computer systems, the backup device is a tape drive, which can accommodate large amounts of data at a relatively low cost per byte of storage. However, because a tape drive is fundamentally a sequential access medium, random access or adjusting backward/forward takes significantly longer for the tape drive compared to the disk drive. Therefore, the most efficient way to use a tape drive is to "stream" the data, i.e. ensure that the tape drive does not have to stop until the backup or restore is complete.

Generally, conventional backup methods provide for either file-by-file backup or image backup. In a file-by-file backup, the backup program copies one file at a time from the disk to the tape. Specifically, the program places all pieces of data for each file, irrespective of actual locations on the disk, into a single sequential block that is stored on the tape. Thus, a file-by-file backup can provide an incremental backup (wherein only those files that have changed since the last backup are written to tape), but is extremely time consuming for a full backup.

In an image backup, the data image is read sequentially from the disk and written to the tape. Thus, in prior art systems in which the disk drive is substantially faster than the tape drive, an image backup can keep the tape drive streaming. However, current technology has significantly improved tape drive speed. In fact, in state of the art systems, the tape drive speed is actually equal to or greater than the disk drive speed. In these systems, the tape drive cannot stream and thus begins to degrade both backup and restore performance.

Therefore, a need arises for backup and restore operations that can take advantage of technology improvements in tape drive speed.

SUMMARY OF THE INVENTION

In accordance with the present invention, the data from a plurality of primary data sources are interleaved and captured in a secondary data source during a backup operation. The interleaving of data allows the overlap of read/write operations performed by the plurality of primary data sources, thereby optimizing the performance of the backup as well as the restore. Typical primary data sources could include disk drives or disk arrays. A typical secondary data source could include a tape drive.

The present invention recognizes the advantages of substantially equal data transfers if most disk drives have substantially the same amount of used bits. Specifically, substantially equal data transfers allows multi-tasking both during backup and restore, thereby improving performance of those operations. For example, backup performance can be optimized if data from a plurality of disk drives are transferred to the tape drive in parallel. In a similar manner, restore performance can be optimized if data from the tape drive are transferred to the plurality of disk drives in parallel. To provide this optimization in one embodiment, the maximum size of a data block to be analyzed from each disk drive during a backup transfer is determined. The used bits from one or more data blocks of a disk drive are read and written to the tape drive until the amount of captured used bits for that disk drive is equal to or greater than the largest amount of used data bits captured from any disk drive previous to that point in time. The disk drives can be read in a round robin sequence. When all the used bits from one disk drive are written to the tape drive, that disk drive is eliminated from the sequence. The remaining disk drives are accessed in a modified sequence. This data interleaving continues until all used bits from all disk drives are written to the tape drive.

During a restore operation, the interleaved data is read from the tape drive and written to the plurality of disk drives. In one embodiment, the interleaved data includes information regarding the original configuration of the data, thereby allowing reconstruction of the original data (i.e. both used and unused bits) for each disk drive.

In another embodiment, a set number of bits to be read from each disk drive during a backup transfer is determined. These bits could include only used bits or could include both used and unused bits. The disk drives are typically read in a round robin sequence. When all the bits from one disk drive are written to the tape drive, that disk drive is eliminated from the sequence. The remaining disk drives are accessed in a modified sequence. This data interleaving continues until all bits from all disk drives are written to the tape drive.

The present invention also recognizes the advantages of data transfer based on percentage bandwidth if multiple disk drives have substantially less than the amount of used bits of other disk drives. In this embodiment, a percentage bandwidth associated with each disk drive can be generated by dividing the amount of used bits from each disk drive by the total number of used bits from all disk drives. The amount of used bits read from each disk drive and written to the tape drive during a transfer is based on the percentage bandwidth. The disk drives can be read in a round robin sequence. When all the used bits from one disk drive are written to the tape drive, that disk drive is eliminated from the sequence. The remaining disk drives are accessed in a modified sequence. This data interleaving continues until all used bits from all disk drives are written to the tape drive. In this weighted interleaved embodiment, each disk drive participates in a transfer in direct proportion to its total used bits. In this manner, disk drives having comparatively large amounts of information are given more data bandwidth, and thus given more opportunity to run at full speed. Therefore, this embodiment can improve the performance of the disk drives having comparatively large amounts of information.

DETAILED DESCRIPTION OF THE DRAWINGS

Figure 1:
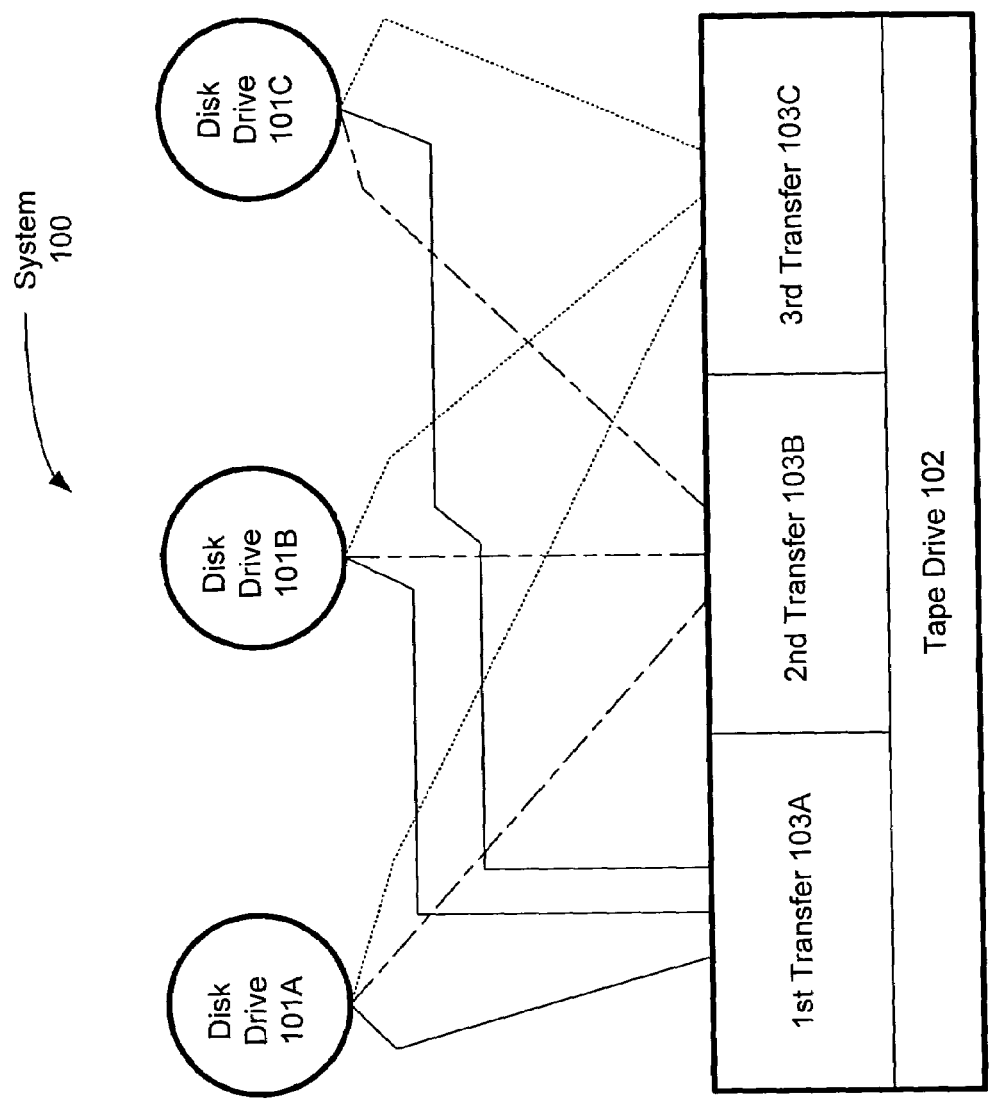
FIG. 1 illustrates a simplified backup/restore configuration in accordance with the present invention.

FIG. 1 illustrates a simplified backup/restore configuration 100 in accordance with the present invention. In configuration 100 during backup, a plurality of disk drives 101A, 101B, and 101C provide data to a tape drive 102. In accordance with the present invention, each disk drive 101 provides its data to tape drive 102 in a round robin sequence. Specifically, during each transfer 103, disk drive 101A provides its backup data first, disk drive 101B provides its backup data second, and disk drive 101C provides its backup data third. Note that although only three disk drives 101 are shown, other embodiments of the invention can include any number of disk drives.

In a backup operation, the number of transfers 103 is dependent upon the amount of data being transferred and the total amount of data being stored in each disk drive 101. For example, in one embodiment, each transfer can include a maximum of 48 megabytes of data from each disk drive 101. Specifically, during a first transfer 103A, the present invention sequentially analyzes the first 48 megabytes of data from disk drives 101A, 101B, and 11C. This sequence of data analysis is also used in second transfer 103B as well as in third transfer 103C.

As is well known to those skilled in the art, a block of data in a disk drive may include both used as well as unused bits. In accordance with one embodiment of the present invention, during transfer 103A, only used bits are actually copied to tape drive 102. In this embodiment, the present invention can capture the information regarding the locations of those used bits and store that information along with the used bits in tape drive 102 for a subsequent restore operation (explained in detail below). Therefore, because only used bits are copied during backup or restore, this embodiment of the present invention can be significantly faster than conventional image-based backup systems.

Figures 2A, 2B:
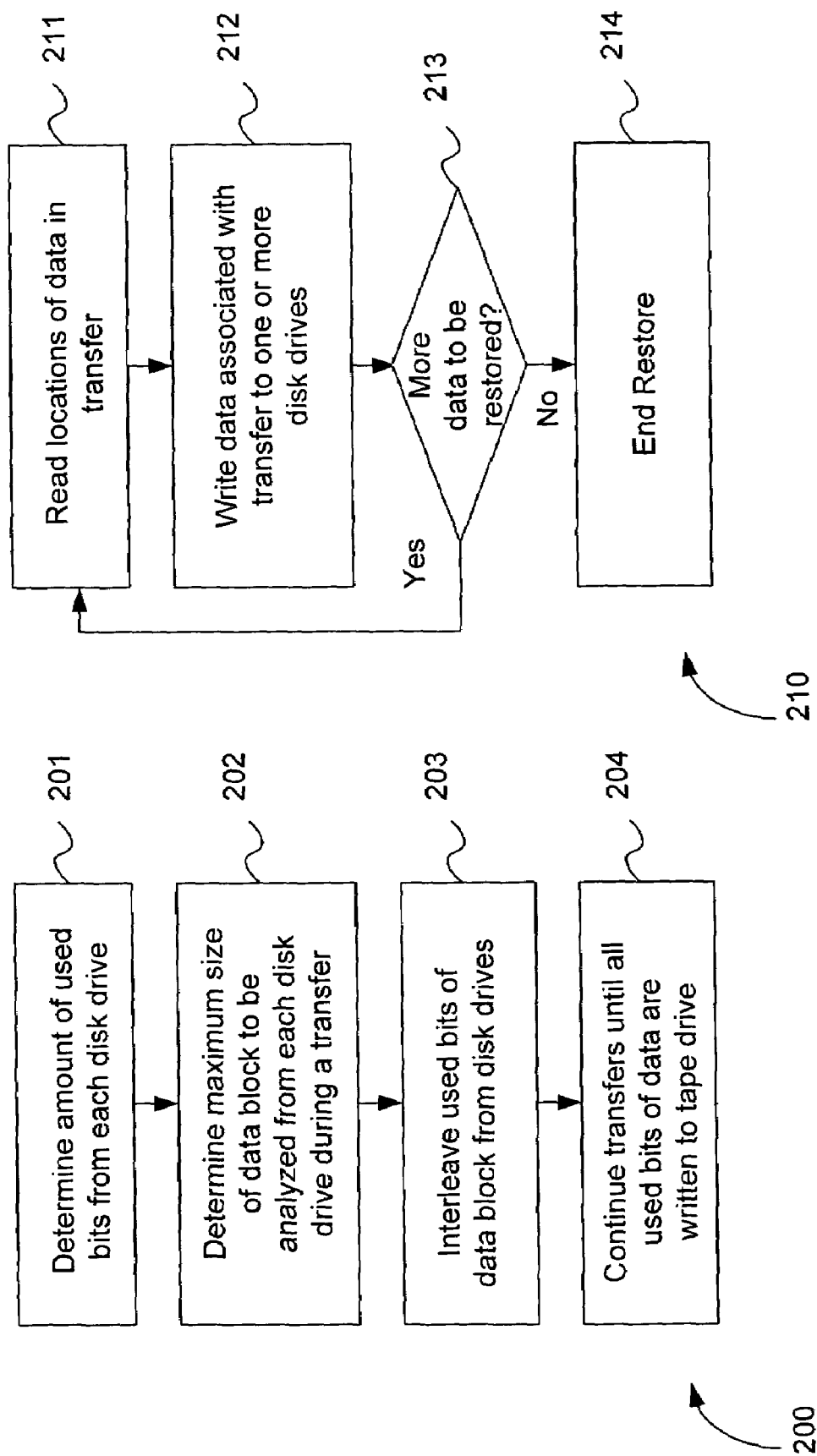
FIG. 2A is a flowchart showing a backup method of the present invention.
FIG. 2B is a flowchart showing a restore method of the present invention.

FIG. 2A is a flowchart that shows a method 200 of backing up data in accordance with one embodiment of the present invention. To clarify the steps described therein, Table 1 provides illustrative amounts of used bits (in megabytes) for three data blocks.

TABLE 1

| Disk Drive    | 101A | 101B | 101C |
|---------------|------|------|------|
| 1st data block | 2    | 10   | 20   |
| 2nd data block | 10   | 20   | 40   |
| 3rd data block | 15   | 45   | 30   |

In step 201, the amount of used bits from each disk drive is determined. In the example provided in Table 1, disk drive 101A has a total of 27 megabytes of used bits, disk drive 101B has a total of 75 megabytes of used bits, and disk drive 101C has a total of 90 megabytes of used bits. This information can be used in determining the maximum size of the data block to be analyzed from each disk drive in step 202.

Specifically, one advantage of the present invention is that multiple disk drives can perform read/write operations in parallel, thereby saving valuable system time during both the backup and restore operations. Clearly, if the maximum data block size is equal to or greater than the used bits of the largest disk drive, then only a single conventional backup sequence would be performed for the plurality of disk drives. Thus, in accordance with one embodiment of the present invention, the maximum data block size is less than the used bits associated with a plurality of disk drives. Note that in typical embodiments, the file system determines the data block size based on how it tracks allocation of data on the disk drives. Note that the file system also identifies the used bits of each data block as part of step 203 (see below). For purposes of illustration, assume the maximum data block size is 48 megabytes.

Using the information in Table 1 for step 203, in a first transfer of data, the present invention sequentially reads 2 megabytes of used bits from disk drive 101A, 10 megabytes from disk drive 101B, and 20 megabytes from disk drive 101C and writes those used bits to the tape drive. Note that this first transfer of data has resulted in less than the total number of used bits being written to the tape drive. Moreover, in the first transfer of data, significantly more data has been written from disk drives 101B and 101C than disk drive 101A.

The present invention recognizes the advantages of substantially equal data transfers if most disk drives have substantially the same amount of used bits. Specifically, substantially equal data transfers allow multi-tasking both during backup and restore, thereby improving performance of those operations. For example, backup performance can be optimized if data from a plurality of disk drives are transferred to the tape drive in parallel. In a similar manner, restore performance can be optimized if data from the tape drive are transferred to the plurality of disk drives in parallel.

Note that a simplified read/write operation (performed for a transfer during a backup or restore operation) includes a setup step, a format step, and a read/write step. In the setup step, the disk drive is prepared to transmit or receive data. In the format step, the used bits associated with each disk drive and the locations of these used bits on each disk drive are identified. In a read/write step, the data are copied to the tape drive (during the backup operation) or to the disk drives (during the restore operation). Thus, performing read/write operations "in parallel" refers to the overlap of any step being performed by one disk drive with a step being performed by at least one other disk drive. Attempting to attain substantially equal data transfers during backup as provided by the present invention increases the probability that parallel reading and/or writing occurs, thereby optimizing overall system performance.

Therefore, in this embodiment, the present invention compensates for unequal data transfers by reading the used bits of one or more data blocks on a disk drive and writing those bits to the tape drive during each transfer. For example, during the second transfer of data, an amount of used bits from disk drive 101A is read to at least equal the captured used bits of disk drive 101C (i.e. the disk drive having the most captured used bits at that point in time). However, as noted in Table 1, disk drive 101A only has 10 megabytes of used bits in its second data block of 48 megabytes. Therefore, the used bits of third data block of disk drive 101A are analyzed. In its third data block, disk drive 101A has an additional 15 megabytes of used bits.

In one embodiment, all used bits in a block are written in a single transfer. Therefore, during the second transfer, 25 megabytes from disk drive 101A (both $2^{nd}$ and $3^{rd}$ data blocks) are written to the tape drive. At this point, disk drive 101A has the most captured bits (27 megabytes) of any disk drive. Therefore, disk drive 101B, currently having only 10 megabytes of captured used bits, would optimally provide at least the amount of used bits captured for disk drive 101A. In the second data block, disk drive 101B has 20 megabytes of used bits, which when combined with the 10 megabytes captured in the first transfer (30 megabytes) is greater than the total captured bits of disk drive 101A. Therefore, the 20 megabytes of used bits are read from disk drive 101B and written to the tape drive during the second transfer.

At this point, disk drive 101C has less captured bits (20 megabytes) than disk drive 101B (30 megabytes). However, in its second data block, disk drive 101C has 40 megabytes of used bits, which when combined with the 20 megabytes captured in the first transfer (60 megabytes) is greater than the captured bits of disk drive 101B. Therefore, these 40 megabytes of used bits are read from disk drive 101C and written to the tape drive during the second transfer.

During the third transfer, because all used data bits have been captured from disk drive 101A, the present invention proceeds to interleave data from any remaining disk drives, i.e. disk drives 101B and 101C in this example. Therefore, 45 megabytes are read from disk drive 101B and written to the tape drive, then 30 megabytes are read from disk drive 101C and written to the tape drive. Because all used bits from all disk drives have now been written to the tape drive, the backup operation ends in step 204.

FIG. 2B is a flowchart showing a restore method 210 in accordance with the present invention. In step 211, the locations of the data in a transfer block are read. Note that these locations designate how much of the data is to be copied to specific disk drives. In other embodiments, these locations include the original configuration of the data from that disk drive (i.e. including both used and unused bits). In step 212, the data associated with the transfer block is written to the designated disk drive(s). If not all data has been restored in step 213, then the next transfer block is analyzed in step 211. On the other hand, if all data has been restored in step 213, then the restore operation is ended in step 214.

Figure 3:
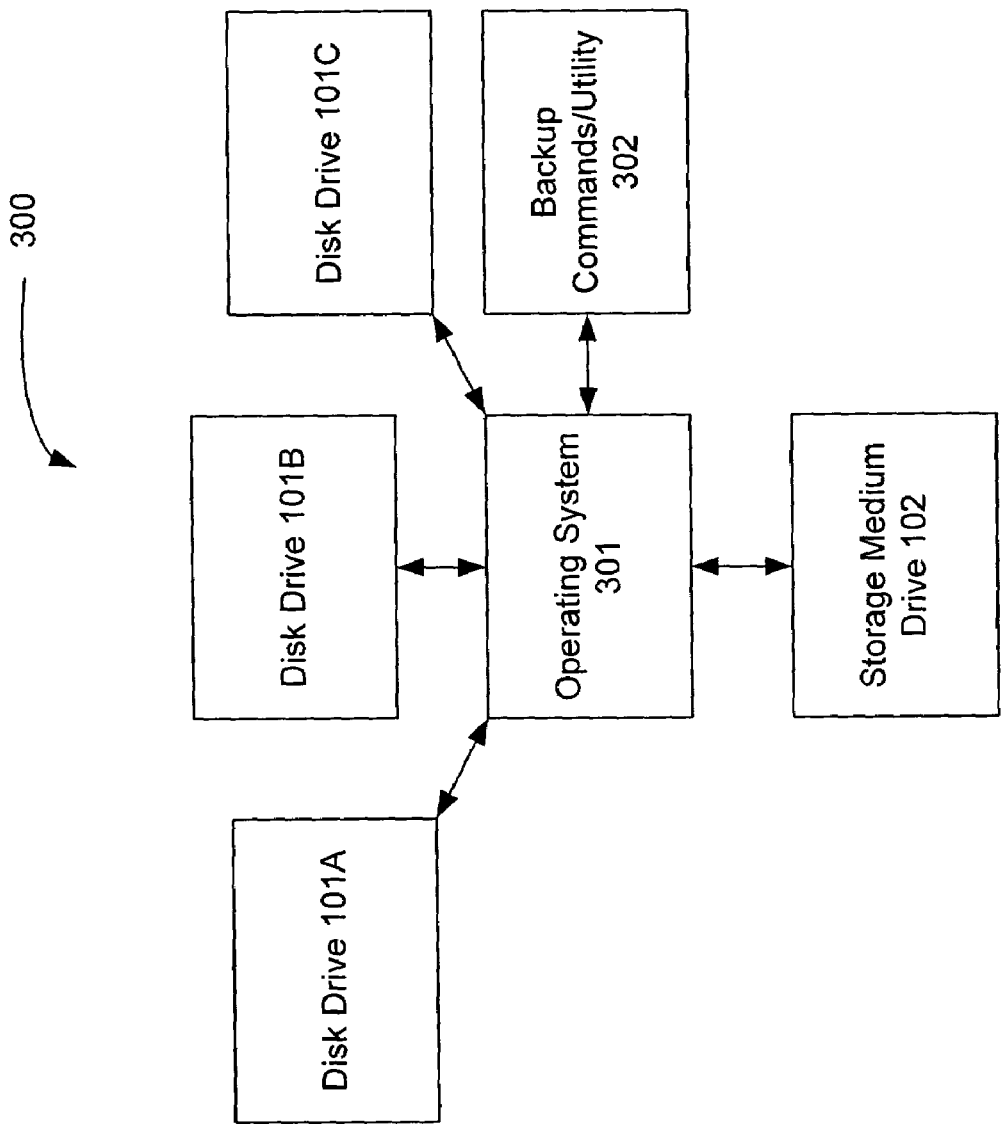
FIG. 3 illustrates a simplified computer system that can implement the present invention.

Referring to FIG. 3, a computer system 300 that can implement the present invention includes an operating system 301 having a software platform on which backup commands/utility 302 can run. Specifically, to direct operating system 301 during the backup or restore operations involving disk drives 101A–101C and tape 102, a user can provide a set of operating system commands or can license a proprietary backup utility from the assignee of the present invention (the functionality of which is described in detail herein). Note that backup commands/utility 302 must be written on top of a particular operating system. Illustrative operating systems include, but are not limited to, DOS, OS/2, Windows NT, and Unix (including Linux). In one embodiment, a system in accordance with the present invention can include a plurality of personal computers each having Intel microprocessors and running a Unix OS. This system can be configured with locally attached tape drives and can include up to 500 gigabytes of disk storage.

Figure 4:
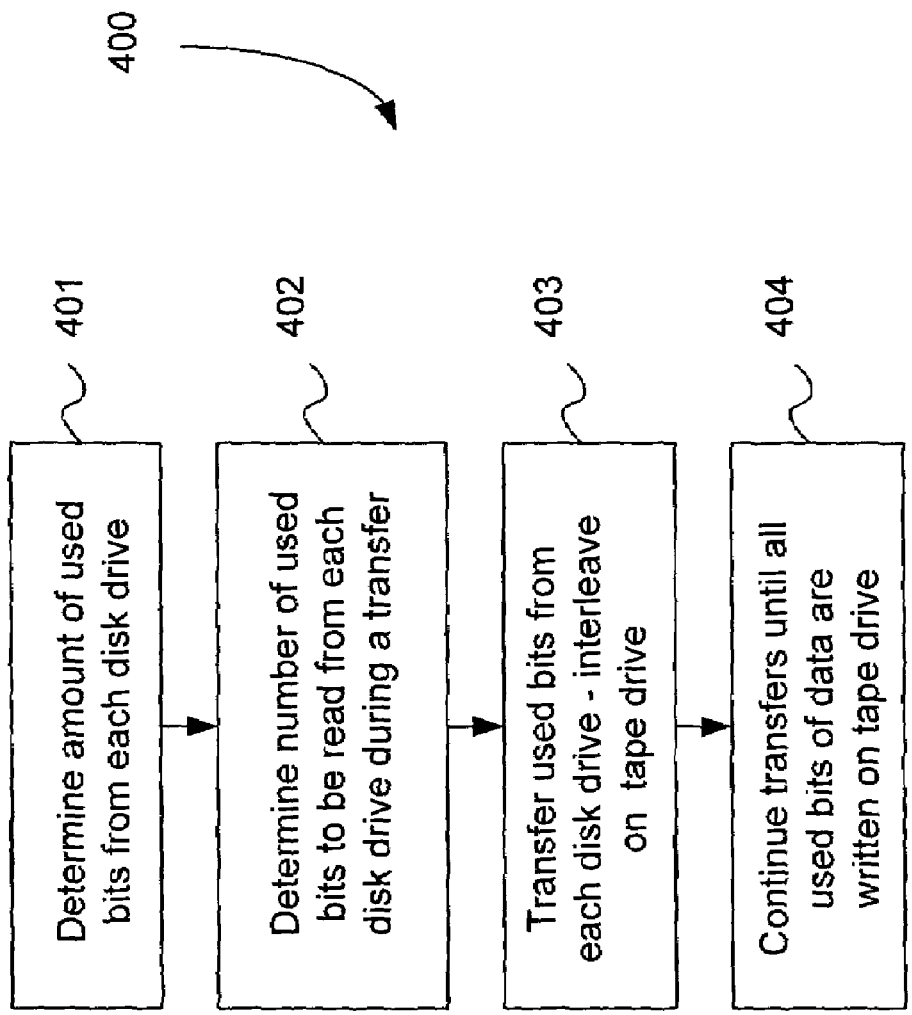
FIG. 4 is a flowchart showing another backup method of the present invention.

As described above, one embodiment of the invention reads all used bits of one or more data blocks and writes those bits to a tape drive during a transfer. In another embodiment of the invention shown in FIG. 4, a predetermined number of used bits are read/written in each transfer. For example, in step 401 of method 400, the system determines the amount of used bits from each disk drive. Knowing the amount of used bits in each disk drive, as in method 300 (FIG. 3), facilitates determining (in step 402) the number of used bits to be written from each disk drive during a transfer. In one embodiment, the used bits for each transfer can be determined by the file system based on how it tracks allocation of data on the disk drives.

For purposes of illustration, assume that disk drives 101A–101C respectively have 27 megabytes, 75 megabytes, and 90 megabytes of used bits. In this embodiment, assume that used bit blocks of 10 megabytes are read from each disk drive and written in an interleaved manner on the tape drive in step 403. In this embodiment, nine transfers would take place until all used bits of data are written on the tape drive (step 404). Note that during the third transfer disk drive 101A could write only 7 megabytes of used bits. In a similar manner, during the eighth transfer, disk drive 101B could write only 5 megabytes of used bits.

Of importance, the present invention provides significant time savings in light of recent advances in tape drive technology. Historically, disk drive transfer rates have been faster than tape drive transfer rates. In fact, some disk drive transfer rates have been as much as ten times the transfer rate of their contemporary tape drives. However, in state of the art technology, tape drive transfer rates are exceeding disk drive transfer rates. Thus, by interleaving the data from multiple disk drives in the tape drive, the present invention allows parallel read/write operations. This multi-tasking ensures tape drive streaming as well as a dramatic reduction in backup and restore time.

In accordance with another embodiment of the present invention, the amount of used data from each disk drive determines the data bandwidth given to each disk drive during backup and restore. This embodiment is particularly advantageous if multiple disk drives have significantly less used data than other disk drives. In this embodiment, instead of attempting to transfer equal amounts of data from the disk drives, the amount of used data transferred from each disk drive is based on the total amount of used data stored on that disk drive. Specifically, any disk drive having a comparatively large amount of used data is given a larger data bandwidth both during backup and restore than a disk drive having a comparatively small amount of used data. In this manner, the present invention ensures the most efficient data transfer for any disk drive having a comparatively large amount of used data.

Figure 5:
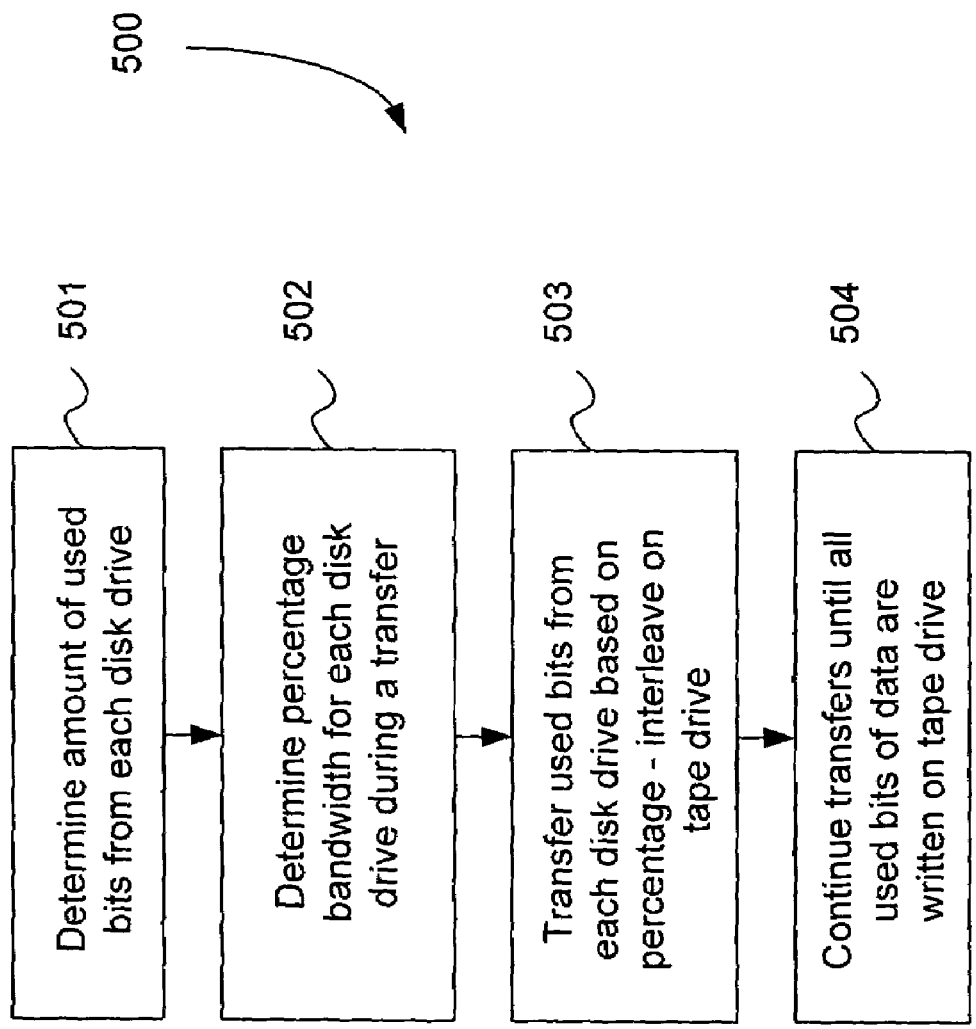
FIG. 5 is a flowchart showing yet another backup method of the present invention.

Referring to FIG. 5, this weighted method 500 begins in step 501 by determining the amount of used bits from each disk drive. Step 501 also includes determining the amount of used data for each transfer. The amount of used data for each transfer is determined by the file system as described above in reference to FIG. 4. In step 502, a percentage of data bandwidth associated with each disk drive is generated by dividing the amount of used bits from each disk drive by the total number of used bits from all disk drives. In step 503, used bits are transferred from each disk drive based on its data bandwidth. For example, assume that the amount of each data transfer is set to 10 megabytes of used bits. Assume further that disk drives 101A–101C (FIG. 1) respectively have 15 megabytes of used bits, disk drive 101B has 20 megabytes, and disk drive 101C has 80 megabytes. Thus, the total amount of used bits is 115 megabytes. In accordance with step 502, disk drive 101A should have a 13% data bandwidth (15/115), disk drive 101B should have a 17% data bandwidth (20/115), and disk drive 101C should have a 70% data bandwidth (80/115). Therefore, in step 503, of the 10 megabytes provided in the data transfer, disk drive 101A would contribute 1.3 megabytes, disk drive 101B would contribute 1.7 megabytes, and disk drive 101C would contribute 7 megabytes. This weighted interleaving is continued until all used bits of data are written on the tape drive as provided in step 504.

As seen from above, in the weighted interleaved embodiment, each disk drive participates in a transfer in direct proportion to its used bits. In this manner, disk drives having comparatively large amounts of information are given more data bandwidth, and thus given more opportunity to run at full speed. Therefore, this embodiment can improve the performance of the disk drives having comparatively large amounts of information.

Note that regardless of embodiment, memory buffers can be included in the present invention to reduce any potential loss of streaming due to variations in the rate of data coming from either the disk drives or the tape drive. In one embodiment of the invention, a memory buffer between 1 and 8 megabytes can be provided during the backup operation, whereas a memory buffer between 128 and 200 megabytes can be provided during the restore operation. In another embodiment, memory buffers for both backup and restore operations are allocated dynamically based on available memory and the number of simultaneous input/output ports.

A system and method for providing interleaved backup is described in various embodiments herein. Those skilled in the art will recognize modifications to those embodiments. For example, the present invention is equally applicable to a plurality of disk arrays. Therefore, the scope of the present invention should only be limited by the appended set of claims.

The invention claimed is:

1. A method for backing up data in a computer system from a plurality of primary data sources to a secondary data source, the method comprising:
    interleaving data from the plurality of primary data sources in the secondary data source, wherein each primary data source participates in direct proportion to its total data.

2. The method of claim 1, wherein the data includes only used bits.

3. A method for backing up data in a computer system from a plurality of primary data sources to a secondary data source, the method comprising:
    interleaving data from the plurality of primary data sources in the secondary data source,
    wherein interleaving includes:
    determining a percentage bandwidth for each primary data source during a transfer, wherein the percentage bandwidth is defined as a total amount of data from a primary data source divided by a total amount of data from all primary data sources.

4. The method of claim 3, further including transferring only used bits from each primary data source to the secondary data source based on the percentage bandwidth of that primary data source.

* * * * *